United States Patent [19]

Roup

[11] 3,775,142
[45] Nov. 27, 1973

[54] IMPROVED CERAMIC COMPOSITIONS FOR HIGH STABILITY CAPACITORS
[75] Inventor: Rolland R. Roup, Alhambra, Calif.
[73] Assignee: Solid State Dielectrics, Inc., Burbank, Calif.
[22] Filed: Jan. 26, 1971
[21] Appl. No.: 109,984

[52] U.S. Cl. ................. 106/73.31, 106/46, 317/258
[51] Int. Cl. ...................... C04b 35/50, C04b 35/46
[58] Field of Search ...................... 106/39 R, 73.31, 106/46; 264/61; 252/520, 62.9

[56] References Cited
UNITED STATES PATENTS

| | | | |
|---|---|---|---|
| 2,908,579 | 10/1959 | Nelson et al. | 106/39 R |
| 3,103,440 | 9/1963 | Cline et al. | 106/39 R |
| 2,432,250 | 12/1947 | Rath | 106/39 R |
| 2,520,376 | 8/1950 | Roup et al. | 106/39 R |
| 2,841,508 | 7/1958 | Roup et al. | 106/39 R |
| 2,985,700 | 5/1961 | Johnston | 106/39 R |
| 3,364,144 | 1/1968 | Pulvari | 252/62.9 |

OTHER PUBLICATIONS

Subbarao – J Phys. Chem. Solids – 23 (1962) pp. 665–676 "A Family of Ferroelectric Bismuth Compounds"

Primary Examiner—Helen M. McCarthy
Attorney—John P. Scholl, Kendrick & Subkow and George J. Netter

[57] ABSTRACT

A ceramic composition useful in forming capacitors and having the following composition expressed in mole percent of the metal oxides present:

neodymium oxide - about 12 to about 20 mole percent;
barium oxide - about 12 to about 20 mole percent;
titanium oxide - about 60 to about 70 mole percent;
bismuth oxide - about 1.5 to about 5 mole percent;
zirconium oxide - 0 to about 5 mole percent;
stannic oxide - 0 to about 5 mole percent;
calcium oxide and/or strontium oxide - 0 to about 10 mole percent
rare earth oxides other than neodymium oxide - ranging up to about one mole percent but preferably less than about 0.6 mole percent;
titanium oxide + stannic oxide + zirconium oxide - about 60 to 70 mole percent, and
barium oxide + calcium oxide + strontium oxide - about 12 to about 25 mole percent.

A dense, substantially non-porous, ceramic dielectric material fired at a suitable temperature within the range of about 1220°C to about 1300°C., having a K value of about 55 to about 90, a temperature coefficient of dielectric constant (TC) of about −100 to about +100 × $10^{-6}$/°C, a % D.F. less than 0.1, and an insulation resistance corresponding to values of at least about 200 ohm-farads ranging up to about 40,000 or more ohm-farads at 125°C.

8 Claims, No Drawings

IMPROVED CERAMIC COMPOSITIONS FOR HIGH STABILITY CAPACITORS

This invention relates to improved ceramic dielectric compositions for use in capacitors. More specifically, the invention relates to improved ceramic dielectric compositions having higher K values while, at the same time, having a temperature coefficient of dielectric constant which is relatively low, coupled with stability to capacitance change and high insulation resistance values.

In designing a capacitor having a given capacitance, the factors governing the design are the area of electrically conducting electrode plates on opposed sides of the ceramic dielectric element, the thickness of the ceramic dielectric, and the dielectric constant K of the ceramic dielectric or insulating material. If the capacitor is of multilayer design, the total area of the opposed electrode plates is considered. If all other factors are held constant, the capacitance is directly proportional to the dielectric constant of the ceramic insulator material. Thus, if the dielectric constant of the ceramic dielectric is increased, the area of the capacitor elements and the opposed electrode plates may be decreased in inverse proportion.

If, however, the dielectric constant of the ceramic material was decreased, it would be necessary to modify the other design parameters in order to obtain a capacitor having the same capacitance value. To compensate for a decrease in the dielectric constant of the dielectric material, the area of the capacitor plates could be increased or the number of plates in the capacitor could be increased. Either of these design modifications would result in increasing the cost of the capacitor. This is especially true in the case of multiple layer, monolithic dielectric capacitors which employ multiple thin layers of ceramic material separated by noble metal electrodes of the platinum-gold-palladium group. As the number of electrode plates in such a capacitor is increased, there is a corresponding increase in the use of the expensive noble metal required for the electrodes. This results in a considerable increase in the overall cost of the capacitor.

Another property of considerable importance in the design of the capacitor is the temperature coefficient of dielectric constant (TC) for the dielectric material. The TC value is determined by the change of the dielectric constant of the dielectric material with changes in the temperature of the capacitor. Desirably, the temperature coefficient of the dielectric constant for many applications the relatively low, i.e., $-100$ to $+100 \times 10^{-6}/°C$. Even more desirably, the value of the temperature coefficient of dielectric constant is within the N.P.O. range which is from $-30$ to $+30 \times 10^{-6}/°C$. The use of a dielectric material which has a relatively low TC value provides a capacitor whose capacitance is relatively constant over a temperature range. This is quite advantageous, for example, if the capacitor is a component designed to maintain a uniform capacitance in an electrical system which functions over a wide temperature range.

Another factor which is of importance in the selection of a dielectric ceramic material for use in a capacitor is the temperature range over which the dielectric material can be fired to provide the desired dielectric properties. Many ceramics are quite sensitive in this regard and must be fired within a very narrow temperature range in order to obtain satisfactory dielectric properties. When this is the case, the processing costs are increased, due to the low yield of satisfactory parts. It is, therefore, desirable that the ceramic materials used in the capacitor may be fired satisfactorily over a reasonably wide temperature range.

In accord with the present invention, I have provided ceramic compositions which produce dielectric materials having high K values of about 55 to about 90 and higher. Unlike previous materials, my ceramic compositions provide high K values while, at the same time, providing temperature coefficients of dielectric constant within the low TC range of about $-100$ to about $+100 \times 10^{-6}/°C$. Preferably, the dielectrics provided by my ceramic compositions have TC values within the N.P.O. range of $-30$ to $+30 \times 10^{-6}/°C$. In addition, my compositions provide ceramic dielectrics having a % D.F. less than about 0.1 and preferably less than about 0.03.

The insulation resistance (IR) of the ceramic dielectrics produced by my compositions are such as to correspond to valves of at least about 200 ohm-farads at 125°C and preferably 1000 ohm-farads or higher. I have obtained insulation resistance values for ceramic dielectrics produced by my compositions which correspond to values in excess of 40,000 ohm-farads at 125°C. Moreover, my compositions may be fired over a reasonably wide temperature range such as 40° or 80°C to provide ceramic dielectrics having good electrical properties.

My ceramic compositions are most conveniently defined in terms of the various oxides which they contain. Certain of these oxides may be present in a combined form in my compositions. However, this does not affect the overall definition of my compositions in terms of the various individual metal oxides which they contain. My compositions contain about 12 to about 20 mole percent of neodymium oxide, about 12 to about 20 mole percent of barium oxide, about 60 to about 70 mole percent of titanium oxide, and about 1.5 to about 5 mole percent of bismuth oxide. Additionally, my compositions may contain from 0 to about 5 mole percent of zirconium oxide, 0 to about 5 mole percent of stannic oxide and about 0 to about 10 mole percent of calcium oxide, strontium oxide, or a mixture thereof. My compositions can also contain trace amounts of other ingredients which are adventitiously present in ceramic compositions as impurities. Rare earth oxides other than neodymium oxide may be present in trace amounts ranging up to about 1 mole percent but are preferably present in amounts less than about 0.6 mole percent.

The total content of titanium oxide, stannic oxide and zirconium oxide present in my compositions ranges from about 60 to 70 mole percent. In the event that a particular composition contains, for example, stannic oxide, it may be necessary to reduce somewhat the titanium oxide content or the zirconia content. The total content of barium oxide, calcium oxide and strontium oxide in my compositions ranges from about 12 to about 25 mole percent. In the event that calcium oxide or strontium oxide is present, the barium oxide content may, thus, be accordingly reduced.

Several methods may be employed in formulating my compositions. The initial step in their preparation involves wet milling the various ingredients for several hours to produce fining and intimate mixing. This is conveniently accomplished in a ball mill with the finely divided materials being discharged from the mill in the form of a slip. The time required for milling will vary depending on the water content of the material within the ball mill, the size of the balls, the degree of loading of the mill, etc. All of these factors affect the time required to fine and to intimately mix the materials. I have found that several hours of milling is generally adequate to intimately mix the materials.

Following the milling, the milled materials in the form of a slip may be dried in any convenient manner, such as by pan drying, belt drying, spray drying, etc. Following drying, the material may be granulated, if desired, to break up any large clumps of material. For example, if the material is pan dried, it may contain lumps of material which may be conveniently broken up by forcing the material through a coarse screen, such as a ten-mesh screen.

Following the granulating procedure, which is optional, the material is then calcined at a temperature of about 1000° to about 1200°C in an oxidizing atmosphere. After calcining, all the materials present in the composition are oxides.

Using the above procedure for the formulation of my compositions, the various ingredients employed may be in a combined state of two or more oxides such as barium titanate, barium zirconate, barium stannate, bismuth zirconate, calcium zirconate and the titanates of bismuth, calcium or strontium. The alkaline earth metals, e.g., barium, calcium and strontium, are reactive in therein oxide forms with water and carbon dioxide. Thus, they are used in my compositions in a pre-reacted form as mixed metal oxides such as the titanates, zirconates and stannates.

In the above procedure, all of the materials are calcined in an oxidizing atmosphere at a temperature of about 1000° to about 1200°C. as the final step in their preparation. Inasmuch as the calcining is performed in an oxidizing atmosphere, this permits the use of materials which are not oxides but which are converted to oxides during the calcining operation. For example, the neodymium oxide content of my compositions may be supplied by using neodymium carbonate or neodymium oxalate or hydrate as a starting material.

In a second procedure which may be used for forming my compositions, the neodymium oxide is first premixed with titanium oxide at weight ratios of neodymium oxide to titanium oxide of about 68:32 to about 52:48. The materials may be mixed to homogeneity by adding them to a ball mill along with water, as described previously, to form a slip. After being discharged from the ball mill, the slip is then dried in any suitable manner. If lumps are formed in the material during the drying operation, the drying may be followed by a granulation step as described previously. These materials are then calcined at a temperature of about 1000° to about 1200°C. in an oxidizing atmosphere.

Following the calcining of the mixture of neodymium oxide and titanium oxide, the calcined material may be added to a ball mill, together with the other ingredients, and milled to homogeneity. Following this, the materials may be dried in any suitable manner and then granulated if desired. Following this, the mixture of materials is then calcined at a temperature of about 1000° to 1200°C in an oxidizing atmosphere. The calcining step is not necessary if all of the materials employed are already in a pre-reacted state. The neodymium oxide may be in a pre-reacted state due to calcining with titanium oxide as described above. By way of example, barium titanate, barium zirconate, calcium titanate, calcium stannate, bismuth titanate and bismuth zirconate are pre-reacted materials. Thus, if all of the materials employed are added as titanates, stannates or zirconates, the final calcining step may be eliminated. Even when employing pre-reacted materials, it is still, however, preferable, in some cases, to calcine the materials in the final step in the manner described above.

To further illustrate my invention, I have presented a number of examples which demonstrate my compositions and the properties which they provide when they are formed into a ceramic dielectric material. In the examples, all parts and percentages are by weight unless otherwise indicated.

The materials used in my examples were ball milled, dried, granulated and calcined at 1150°C under an oxidizing atmosphere in the manner described previously. In Examples 1–7, the neodymium oxide and titanium oxide were ball milled, dried, granulated and calcined at 1150°C in an oxidizing atmosphere to form a pre-reacted material. The pre-reacted material was then ball milled along with the other ingredients, dried and then granulated and the mixture was calcined at 1150°C in an oxidizing atmosphere. In Examples 7–13, the neodymium oxide and titanium oxide were not premixed and pre-calcined but were merely added separately along with the other ingredients, and then dried, granulated and calcined at 1150°C in an oxidizing atmosphere.

The compositions set forth in the following table were then formed into ceramic dielectric bodies. This was accomplished by milling the materials in a ball mill for about 20 hours, together with an acrylic resin binder (Acryloid B-7, Rohm & Haas Co.). For each 100 parts of ceramic powder, there were employed about 50 parts of acrylic resin, an additional 50 to 100 parts of a chlorinated hydrocarbon solvent, and about 0.4 to 0.5 parts of plastercizer (sanitisizer - 160). After milling for about 20 hours, the material was cast on a glass plate to a dried thickness of about 3 mils with a doctor blade spreader. The cast material was air-dried at room temperature and was then stripped from the plate. Following this, the strip was cut into rectangles measuring approximately 3 inches × 1 inch, and a plurality of the rectangular pieces were then compressed under about 10,000 lbs. of pressure for a short period such as 10 to 20 seconds to provide a body having a compressed thickness of about 0.026 to about 0.028 inches. This material was then diced into one-half inch squares and the squares were fired in a continuous electric tunnel kiln while resting on zirconium oxide plates. The kiln was operated on a 7-hour cycle, i. e., about 7 hours to pass through the kiln with the material being maintained for about 1 hour at the elevated firing temperatures shown in the following table.

Following the firing step to form a ceramic dielectric body, the opposite sides of each of the bodies, which had been reduced in size by about 25% due to shrinkage during firing, were painted with a conductive silver paint and were then dried and fired to 1500°F for about 15 minutes to fuse the coatings. Following this, leads were connected to the opposite sides and electrical measurements were taken to determine the dielectric properties of the ceramic material. The various dielectric properties for the ceramic material which were measured are set forth in the table.

The above described procedure for forming a ceramic dielectric is conventional and does not form a part of my invention. Any of the fabrication methods known to the art may be used in forming my compositions into ceramic dielectrics.

produce dielectric materials having K values in the order of about 50 to 90 while, at the same time, having relatively low TC values. The higher K values are achieved without sacrificing the stability of the dielectric constant with respect to temperature changes. The %D.F. values, as shown on the table, further demonstrate that the dielectric materials of the present invention will have low electrical losses.

TABLE I
(Weight Percent)

| Example number | $BaTiO_3$ | $BaZrO_3$ | $BiTiO_3$ | $BiZrO_3$ | $CaTiO_3$ | $CaSnO_3$ | $CaZrO_3$ | $Nd_2O_3$ to $TiO_2$ ratio of 58:42 | $TiO_2$ | $Nd_2O_3$ | Firing temp., °C | K | Percent D.E. | T.C. | Ohm-farad |
|---|---|---|---|---|---|---|---|---|---|---|---|---|---|---|---|
| 1 | 20 | | 20 | | | | | 60 | 25.2 | 34.8 | 1,240 | 87 | .02 | −17 | 1,300 |
| 2 | 20 | | 20 | | | | | 60 | 25.2 | 34.8 | 1,280 | 87 | .02 | −17 | 1,800 |
| 3 | 25 | | 15 | | | | | 60 | 25.2 | 34.8 | 1,280 | 81 | .01 | −07 | 3,000 |
| 4 | 20 | 4 | 12 | | | | | 64 | 26.9 | 37.1 | 1,280 | 79 | .01 | −08 | 6,000 |
| 5 | 22 | 4 | 8 | | | | | 66 | 27.7 | 38.3 | 1,280 | 75 | .01 | −19 | 4,800 |
| 6 | 22 | | 8 | | | 4 | | 66 | 27.7 | 38.3 | 1,280 | 78 | .03 | −33 | 2,800 |
| 7 | 24 | 6 | 10 | | | | | 60 | 25.2 | 34.8 | 1,280 | 69 | .01 | −66 | 17,000 |
| 8 | 24 | 6 | 10 | | | | | | 25 | 35 | 1,280 | 67 | .01 | +78 | 30,000 |
| 9 | 24 | | 10 | | 6 | | | | 25 | 35 | 1,280 | 66 | .02 | +37 | 3,800 |
| 10 | 24 | | 10 | | | 6 | | | 26.5 | 33.5 | 1,280 | 78 | .01 | +27 | 42,000 |
| 11 | 24 | | | 10 | 6 | | | | 25 | 35 | 1,280 | 70 | .02 | +24 | 5,000 |
| 12 | 14 | | 10 | | | | | | 32 | 44 | 1,280 | 55 | .03 | +49 | 200 |
| 13 | 20 | | 10 | | | | 10 | | 25 | 35 | 1,280 | 80 | .01 | +15 | 1,800 |

With reference to the above table, the Example numbers are set forth in the first column and the concentrations of the various materials are set forth in weight percent in Columns 2–11. In Column 4, the material indicated as bismuth titanate is a mixture of about 72–74 percent by weight of bismuth oxide and 25–27 percent by weight of titanium dioxide. In Column 5, the material indicated as bismuth zirconate is a mixture of approximately 72% by weight of bismuth oxide and 27% by weight of zirconium dioxide with about 1.0 weight percent of silicon dioxide.

In Column 9 is indicated the concentration by weight of pre-reacted neodymium oxide with titanium dioxide at a weight ratio of neodymium oxide to titanium dioxide of 58:42. In Column 10 is indicated the weight percent of titanium dioxide and in Column 11 is the weight percent concentration of neodymium oxide. In Examples 1–7, where the neodymium oxide and titanium dioxide were pre-reacted before being admixed with the other ingredients in the composition, the percentages shown in Columns 10 and 11 indicate, respectively, the total amount of titanium dioxide and neodymium oxide which are present in a pre-reacted state in the composition. In Examples 8–13, the titanium dioxide and the neodymium oxide were not employed in a pre-reacted state.

Column 12 in the above table indicates the firing temperature that was employed in forming the composition into a ceramic dielectric body. The materials were maintained at the indicated firing temperatures for about 1 hour while being passed through the continuous tunnel kiln in the manner described previously.

The K values or dielectric constants for the ceramic bodies are set forth in Column 13. These values were measured at a temperature of 25°C. The %D.F. values shown in Column 14 were also measured at 25°C and one KC. The TC values set forth in Column 15 are expressed in parts per million per degree C or $10^{-6}/°C$. These values were measured over the temperature range from 25° to 125°C. The ohm-farad values set forth in Column 16 were measured at 125°C.

The data set forth in the above table clearly demonstrates that the compositions of the present invention The ohm-farad values shown in the above table were determined at 125°C. While at 125°C, 500 volts was impressed across the ceramic dielectric for 2 minutes and the resistance of the ceramic dielectric was then immediately read. The capacitance of the ceramic dielectric was also measured at 125°C. The ohm-farad values were obtained by multiplying the measured resistance in ohms at 125°C by the measured capacitance in farads at the same temperature.

The significance of the ohm-farad value is that it is a constant for the dielectric material and is a basis for comparing capacitors of different size. The high ohm-farad values demonstrate that the electrical leakage of my dielectrics is low such that they may be used in capacitors having very high capacitance values.

The various ingredients employed in the Examples of Table I are commercially available from TAM Division, National Lead Corporation or from Transelco Corporation. The barium titanate contained 33.5 to 33.9 percent by weight of titanium dioxide and 63.8 to 64.2 weight percent of barium oxide together with minor amounts of silicon dioxide, aluminum oxide, strontium oxide and sodium oxide. The barium zirconate contained 41.0 to approximately 44.0 weight percent of zirconium dioxide, 53.0 to 55.0 weight percent of barium oxide, about 2.0 to 3.0 weight percent of silicon dioxide and minor amounts of titanium dioxide and aluminum oxide. The calcium stannate contained 64.80 percent by weight of stannic oxide and 23.91 percent by weight of calcium oxide while the calcium titanate contained 39.0 to 41.0 weight percent of calcium oxide and 55.0 to about 59.0 weight percent of titanium dioxide with minor amounts of silicon dioxide and aluminum oxide. The calcium zirconate contained 65.0 to about 68.5 weight percent of zirconium dioxide, 28.0 to about 31.0 weight percent of calcium oxide, about 3.0 to 4.0 weight percent of silicon dioxide and minor amounts of titanium dioxide and aluminum oxide.

The concentrations of the various ingredients of the composition, as shown in Table I, are set forth in weight percent. In Table II, which follows, the same compositions are identified in terms of the mole percent of the metal oxides present.

3,775,142

TABLE II
(Mole Percent)

| Example number | BaO | CaO | Bi$_2$O$_3$ | Nd$_2$O$_3$ | TiO$_2$ | SnO$_2$ | ZrO$_2$ | BaO plus CaO | TiO$_2$ plus SnO$_2$ plus ZrO$_2$ |
|---|---|---|---|---|---|---|---|---|---|
| 1 | 12.5 | | 4.7 | 15.1 | 67.7 | | | | |
| 2 | 12.5 | | 4.7 | 15.1 | 66.7 | | | | |
| 3 | 15.2 | | 3.4 | 14.6 | 66.8 | | | | |
| 4 | 14.2 | | 2.7 | 15.6 | 65.4 | | 2.1 | | 67.5 |
| 5 | 15.6 | | 1.8 | 16.4 | 64.2 | | 2.0 | | 66.2 |
| 6 | 13.0 | 2.7 | 1.8 | 15.7 | 64.1 | 2.7 | | 15.7 | 66.8 |
| 7 | 17.6 | | 2.3 | 14.4 | 62.7 | | 3.0 | | 65.7 |
| 8 | 17.7 | | 2.2 | 14.6 | 62.5 | | 3.0 | | 65.5 |
| 9 | 14.1 | 4.5 | 2.2 | 14.1 | 60.6 | | 4.5 | 18.6 | 65.1 |
| 10 | 13.7 | 4.5 | 2.1 | 13.2 | 62.0 | | 4.5 | 18.2 | 66.5 |
| 11 | 13.7 | 5.9 | 2.1 | 13.9 | 61.9 | | 3.0 | 19.6 | 64.4 |
| 12 | 8.6 | | 2.3 | 18.7 | 70.4 | | | | |
| 13 | 15.6 | 7.45 | 1.8 | 16.4 | 64.2 | | 2.0 | 23.05 | 66.2 |

As illustrated by Table II, above, my compositions having metal oxide contents within the percentage ranges previously indicated provide ceramic dielectrics having superior properties. When Example 11 is repeated with a substitution of strontium titanate for calcium titanate a dielectric having good electrical properties is obtained.

An additional advantage in the use of my compositions is that they produce essentially non-porous dielectric materials. The porosity of the resulting ceramic dielectrics may be conveniently determined according to an ink stain test. In this test, the ceramic dielectric material, which has been fired in the manner described previously, is immersed in ink for about 30 seconds. Following this, the dielectric material is removed from the ink, rinsed quickly in water and its surfaces wiped off with a dry cloth. If the material is essentially non-porous, there will be no visible ink stain on the surface and the material is given a test rating of "1." If there is a light surface stain, the material is given a "2" rating. If there is some penetration of the ink into the body of the material, in addition to the surface staining, the material is given a "3" rating and if there is a great deal of penetration into the body of the material, the material is given a "4" rating. The dielectric materials produced by my compositions gave fairly consistent ratings of 1 according to the above test, thus demonstrating the essentially non-porous nature of the resulting ceramic dielectrics. The ink used in the test is not critical and any water base ink or dye may be employed.

In forming the compositions of my invention, the concentrations of the various ingredients may be adjusted so as to vary the TC value of the resulting dielectric material. Neodymium oxide and bismuth oxide are positive TC shifting ingredients; calcium, strontium, zirconium oxide and stannic oxide are negative TC shifting, and titanium is a positive shifter. Bismuth titanate and barium titanate are fairly neutral in regard to shifting the TC of the dielectric. By increasing the negative shifting TC ingredients, the TC of the dielectric can be made more negative. Conversely, an increase in the positive shifting TC ingredients results in a more positive TC value for the dielectric.

Various materials, such as mineralizers or electrical modifiers may be present in my compositions in minor amounts of about 0.1 to about one percent by weight. Typical of such materials are silicon dioxide, cobalt oxide, manganese dioxide, zinc oxide, zinc titanate, niobium oxide and tantalum oxide.

I claim:

1. A finely divided, milled ceramic dielectric composition consisting essentially of about 12 to about 20 mole percent neodymium oxide, about 12 to about 20 mole percent barium oxide, about 60 to about 70 mole percent of titanium oxide, about 1.5 to about 5 mole percent of bismuth oxide, from 0 to about 5 mole percent of zironium oxide, from 0 to about 5 mole percent of stannic oxide, from 0 to about 10 mole percent of calcium oxide, strontium oxide or mixtures thereof, and having a content of rare earth oxides other than neodymium oxide ranging up to about one mole percent, the total content of said titanium oxide, stannic oxide and zirconium oxide ranging from about 60 to about 70 mole percent and the total content of barium oxide, calcium oxide and strontium oxide ranging from about 12 to about 25 mole percent.

2. The composition of claim 1 wherein the barium oxide, calcium oxide and strontium oxide are present as titanates, zirconates and stannates.

3. The composition of claim 2 wherein the bismuth oxide is present as a titanate, zirconate or stannate.

4. The composition of claim 1 wherein said neodymium oxide is present in a pre-reacted combined form with titanium oxide at a weight ratio of neodymium oxide to titanium oxide of about 68:32 to about 52:48.

5. The composition of claim 3 wherein said neodymium oxide is present in a pre-reacted combined form with titanium oxide at a weight ratio of neodymium oxide to titanium oxide of about 68:32 to about 52:48.

6. A dense, substantially non-porous ceramic dielectric material having a K value of about 55 to about 90, a temperature coefficient of dielectric constant of about −100 to +100 × $10^{-6}$/°C, a %D.F. less than 0.1, an insulation resistance such as to correspond to values of at least about 200 ohm-farads at 125°C, said dielectric material having a composition consisting essentially of about 12 to about 20 mole percent neodymium oxide, about 12 to about 20 mole percent barium oxide, about 60 to about 70 mole percent of titanium oxide, about 1.5 to about 5 mole percent of bismuth oxide, from 0 to about 5 mole percent of zirconium oxide, from 0 to about 5 mole percent of stannic oxide, from 0 to about 10 mole percent of calcium oxide, strontium oxide or mixtures thereof, and having a con-tent of rare earth oxides other than neodymium oxide ranging to about one mole percent, the total content of said titanium oxide, stannic oxide and zirconium oxide ranging from about 60 to about 70 mole percent and the total content of barium oxide, calcium oxide and strontium oxide ranging from about 12 to about 25 mole percent.

7. The ceramic dielectric of claim 6 having a %D.F. of 0.03 or less.

8. The ceramic dielectric of claim 6 having an insulation resistance corresponding to values of at least about 1000 ohm-farads.

* * * * *

UNITED STATES PATENT OFFICE
CERTIFICATE OF CORRECTION

Patent No. 3,775,142          Dated November 27, 1973

Inventor(s) Rolland R. Roup

It is certified that error appears in the above-identified patent and that said Letters Patent are hereby corrected as shown below:

Column 1, line 50, "the" should read -- is --.

Column 2, line 21, "valves" should read -- values --.

Column 4, line 41, "plastercizer" should read --plasticizer--

Table I, "% D.E." should read -- % D.F. --.

Table I, column T.C., "+27" should read -- -27 --.

Claim 6, column 8, line 58, "ranging to" should read --ranging up to --.

Signed and sealed this 26th day of November 1974.

(SEAL)
Attest:

McCOY M. GIBSON JR.          C. MARSHALL DANN
Attesting Officer          Commissioner of Patents